United States Patent [19]

Borza

[11] Patent Number: 5,680,205

[45] Date of Patent: Oct. 21, 1997

[54] FINGERPRINT IMAGING APPARATUS WITH AUXILIARY LENS

[75] Inventor: Stephen J. Borza, Ottawa, Canada

[73] Assignee: Dew Engineering and Development Ltd., Ottawa, Canada

[21] Appl. No.: 698,645

[22] Filed: Aug. 16, 1996

[51] Int. Cl.⁶ .................................................. G06K 9/74
[52] U.S. Cl. .................... 356/71; 382/116; 382/118; 382/124; 382/127
[58] Field of Search ............... 356/71; 340/825.3, 340/825.31, 825.34, 825.69, 825.7, 825.71, 825.72; 382/116, 118, 124–127; 358/108

[56] References Cited

U.S. PATENT DOCUMENTS

| | | | |
|---|---|---|---|
| 5,222,152 | 6/1993 | Fishbine et al. | 382/116 |
| 5,546,471 | 8/1996 | Merjanian | 382/124 |

Primary Examiner—Frank G. Font
Assistant Examiner—Michael P. Stafira
Attorney, Agent, or Firm—Neil Teitelbaum & Associates

[57] ABSTRACT

The invention is concerned with apparatus for use in a fingerprint imaging system, of the type comprising a light source; a fingerprint testing station for producing and transmitting an image of a fingerprint reflected off a fingertip; a first lens positionable for receiving light from the fingerprint testing station and for producing an image of the fingerprint; aid a CCD camera positionable in a first optical path which includes the fingerprint testing station and the first lens and which is capable of converting the fingerprint image into an electrical signal. In accordance with the invention, the apparatus further includes a second lens capable of receiving miscellaneous images of objects viewable from the vicinity of the apparatus which are displaced from the fingerprint testing station, and mechanism for selectively providing a further optical path including the second lens and the CCD camera while interrupting the first optical path. This allows the CCD camera to be used selectively for imaging the objects as well as for imaging fingerprints.

10 Claims, 5 Drawing Sheets

FINGERPRINT IMAGING APPARATUS WITH AUXILIARY LENS

FIELD OF THE INVENTION

The present invention relates to fingerprint imaging apparatus which may be used to produce an image of a person's fingerprint, either to produce data relating to such fingerprint, or to verify a person's identification.

BACKGROUND OF THE INVENTION

Fingerprint imaging systems are known which include the following components:

a fingerprint testing station including a light source for producing and transmitting an image of a fingerprint reflected off a finger tip;

a lens, termed a "producing" lens, for receiving the image of the fingerprint; and a camera such as a CCD camera positioned to receive the light transmitted through the lens and capable of converting the fingerprint image into an electrical signal.

Such a system will be referred to as being a system "of the type described". Examples of such systems are shown, for example, in the following patents:

U.S. Pat. No. 4,905,293, which issued Feb. 27, 1990 to Asai et al.;

U.S. Pat. No. 5,109,427, which issued Apr. 28, 1992 to Yang;

U.S. Pat. No. 5,187,748, which issued Feb. 16, 1993 to Lee;

U.S. Pat. No. 5,189,482, which issued Feb. 23, 1993 to Yang; and

U.S. Pat. No. 5,233,404, which issued Aug. 3, 1993 to Lougheed et al.

The CCD cameras used in these devices may be small video cameras which are suitable for more general use. The present invention makes use of such a camera, and provides an auxiliary lens, and other mechanism, which allows the camera of such a system to be used selectively for imaging objects in the neighbourhood of the apparatus, as well as for producing the fingerprint images.

SUMMARY OF THE INVENTION

In accordance with the present invention, in a fingerprint imaging system of the type described, the apparatus further includes:

a second or auxiliary lens capable of receiving miscellaneous images of objects viewable from the vicinity of the apparatus and which are displaced or distant from the fingerprint testing station; and means for selectively providing a further optical path including said second lens and the CCD camera while interrupting a first optical path which includes the fingerprint testing station and the camera;

whereby the CCD camera may be used selectively for imaging such objects or for imaging fingerprints.

The apparatus preferably includes a tiltable or swivelling mounting for the auxiliary lens and for the camera which allows the auxiliary lens to be moved to view different objects. Alternatively, where the testing station includes a prism, the apparatus may include a swivelling mounting for the auxiliary lens and the prism which allows the prism to be moved out of the optical path including the camera while the auxiliary lens is moved into this optical path to allow the camera to view objects through the auxiliary lens.

It will be understood that the term "fingerprint" is used in the sense of the pattern of ridges of a finger tip, rather than the print left on an object by a finger tip.

BRIEF DESCRIPTION OF THE DRAWINGS

Preferred embodiments of the invention will now be described by way of example with reference to the accompanying drawings, in which.

DETAILED DESCRIPTION

Figure 1A:
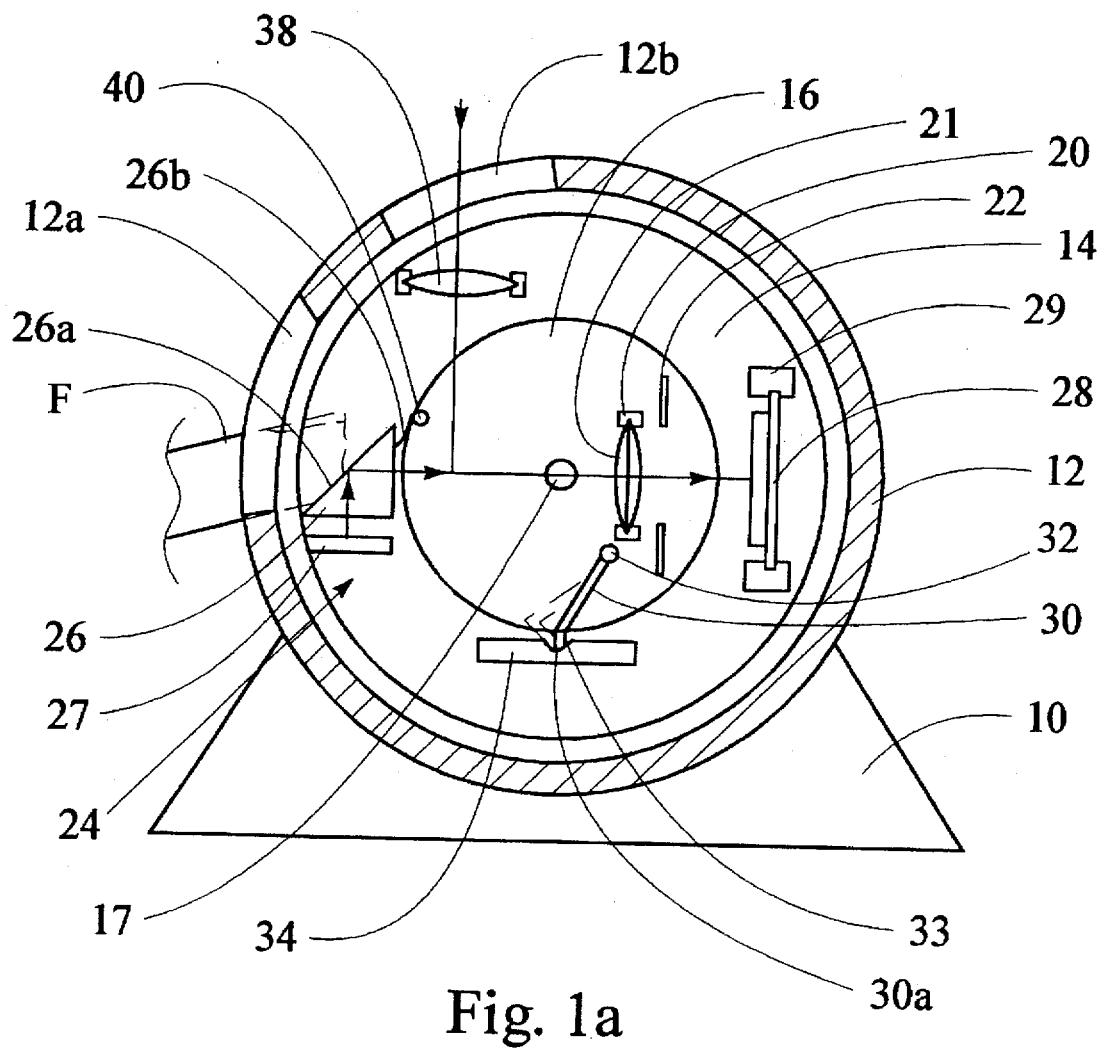
FIG. 1a shows a sectional elevation of a first embodiment of apparatus, in a first position.
Figure 1B:
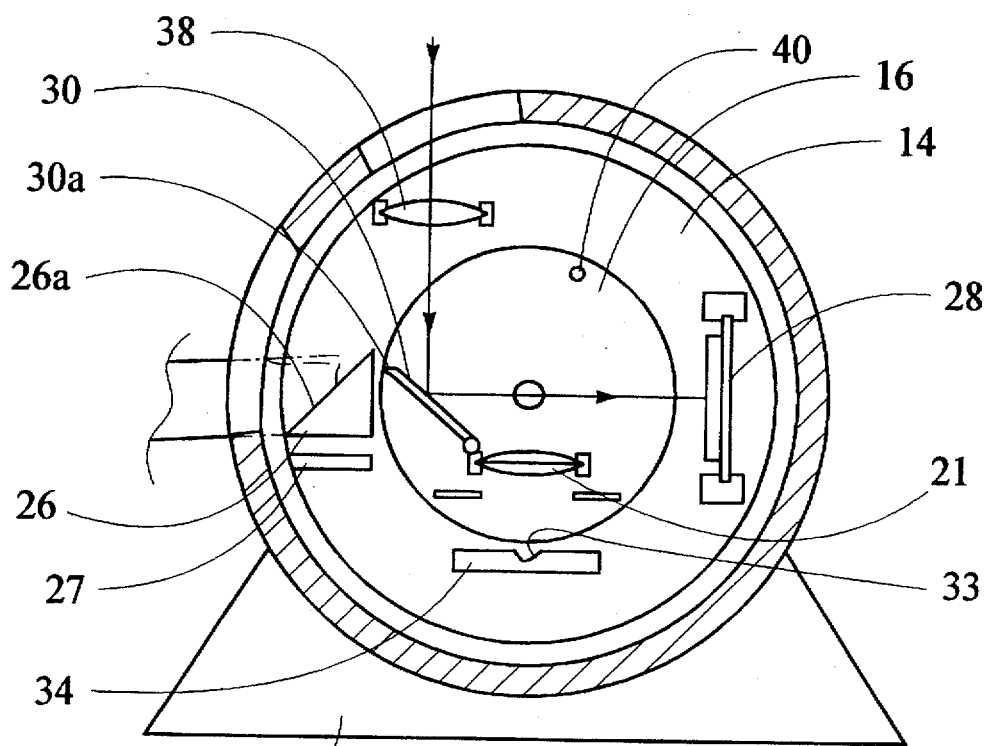
FIG. 1b shows the same embodiment in a second position.

Referring to FIGS. 1a and 1b, the apparatus includes a base 10, which has a spherical recess holding a spherical housing 12 which can both be tilted and rotated through limited angles of movement, say around 180E.

Within the housing 12, and off-set from its center, is a circular plate 14, which is vertical when the parts are as shown in the drawings. On the center of this is rotatably mounted an inner mounting plate 16 which is circular and rotatable relative to plate 14 on a central shaft 17. This mounting plate carries, off-set from its center, a holder 20 for a first lens 21, which is aligned with a fixed iris 22; this iris eliminates distortions coming from the edges of the lens.

On one side of the periphery of plate 14, outside the rotatable mounting plate 16, there is mounted a fingerprint testing station 24 comprising a prism 26 and a light source 27. The light source is an array of light-emitting diodes which direct light into a first face of the prism, the light being reflected off the slant face 26a of the prism, and leaving through an inner face 26b. The slant face 26a is suitable for receiving a fingertip indicated at F which can be inserted through aperture 12a in the housing 12, the fingerprint of which modifies the light leaving the prism.

On the side of the plate 14 opposite to the station 24 is a CCD camera 28, held to plate 14 by support 29, and which is positioned in alignment with the rear face 26b of the prism, along an axis which passes across the center of the plates 14 and 16. The optical path between the prism and the CCD camera includes the lens 21 when the plate 16 is in the position shown in FIG. 1a, relative to plate 14. Thus, for fingerprint testing, the lens 21 can produce an image of the lighted fingerprint on the CCD camera 28, to allow the apparatus to be used for fingerprint monitoring or other operations, in accordance with known systems. Also mounted on the rotatable mounting plate 16 is a mirror 30, pivotal about a mount 32. The pivot mount allows the mirror to swing relative to the plate 16 from an outer position, shown in FIG. 1a, where it is out of the optical path between the prism and the lens 21, to an inner position, shown in FIG. 1b. This movement is interlocked with movement of the plate 16, relative to plate 14, through 90E, between the FIG. 1a and FIG. 1b positions. This interlock includes an extremity 30a of the mirror which, in the outer position shown in FIG. 1a, engages in a notch 33 on a part 34 solid with the outer periphery of the plate 14, to prevent movement of the rotatable mounting until the mirror is moved to the inner position.

A further feature of the arrangement is an auxiliary or second lens 38, also mounted on the periphery of the support plate 14 inside an aperture 12b of the housing 12, and having an axis off-set 90E from that of the optical path between the prism and the CCD camera. This lens 38 is positioned so that its axis is aligned with the mirror 30 when this is in its inner position, and when the rotatable plate 16 has been moved to the FIG. 1b position. In this situation, objects in the neighbourhood can be viewed by the CCD camera, looking through the mirror 30 and the lens 38, while any light coming from the prism is blocked by the mirror. The rotatable mount for the housing 12 allows the lens to be directed in a variety of directions.

The movement of the mirror between its two positions can be effected manually by a finger inserted through the aperture 12a and moving a small projection 40 fixed to rotatable plate 16. Alternatively, the central shaft 17 which mounts the plate 16 can have an extension outside the housing 12 where it carries a knob by which the plate 16 can be rotated.

Figure 2A:
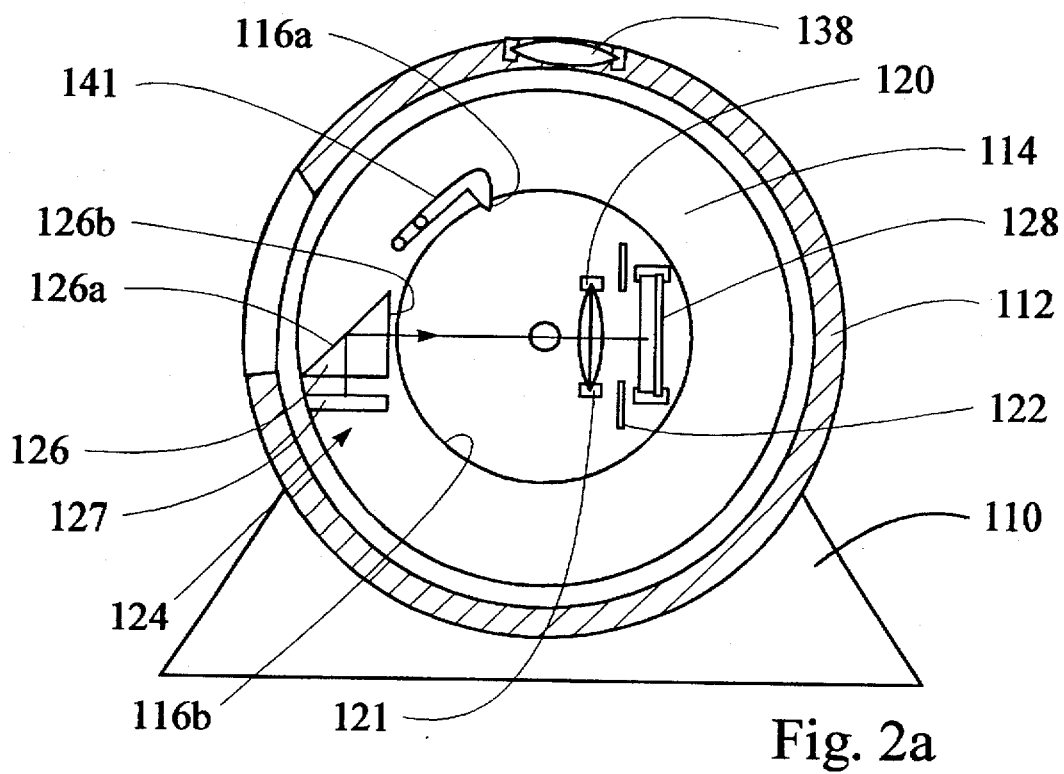
FIG. 2a shows a second embodiment of the invention in a first position.
Figure 2B:
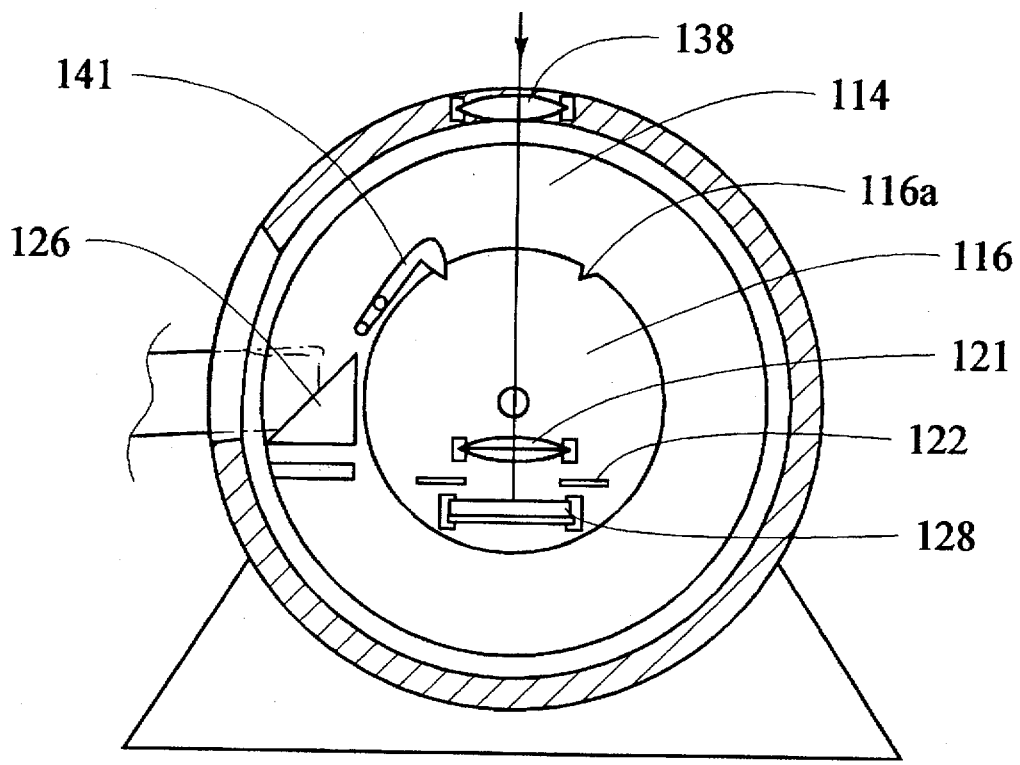
FIG. 2b shows the embodiment of FIG. 2a in a second position.

FIGS. 2a and 2b show an alternative arrangement, in which the camera is mounted on the rotatable mounting plate 116, and which does not require a mirror.

Here, base 110, housing 112, plate 114, rotatable plate 116, and fingerprint station 124 with prism 126 and light source 127, are similar to parts 10, 12, 14, 16, 24, 26 and 27 of the first embodiment. The plate 116 in this embodiment, however, carries the camera 128 near to its periphery, located so that in the first position, shown in FIG. 2a, the camera is in a first optical path which includes the prism 126, the lens 121, and the iris 122. The plate 116 is held in this first position by a pawl 141 which engages in a notch 116a in the side of plate 116, but the plate is rotatable through 90E into the FIG. 2b position in which the pawl engages a second notch 116b. The plate 116 can be rotated by means similar to those described for the first embodiment.

The auxiliary lens 138 in this embodiment is mounted in the side of housing 112 so as to have an axis which passes across the common center of plates 114 and 116 at 90E to the first optical axis which contains the prism, lens 121, and camera when in the position of FIG. 2a. In the FIG. 2b position lens 138 is aligned with the lens 121, the iris 122, and the camera 128, and the latter can therefore be used for viewing objects in the vicinity of the device, light from which passes through both lenses 138 and 121.

Figure 3A:
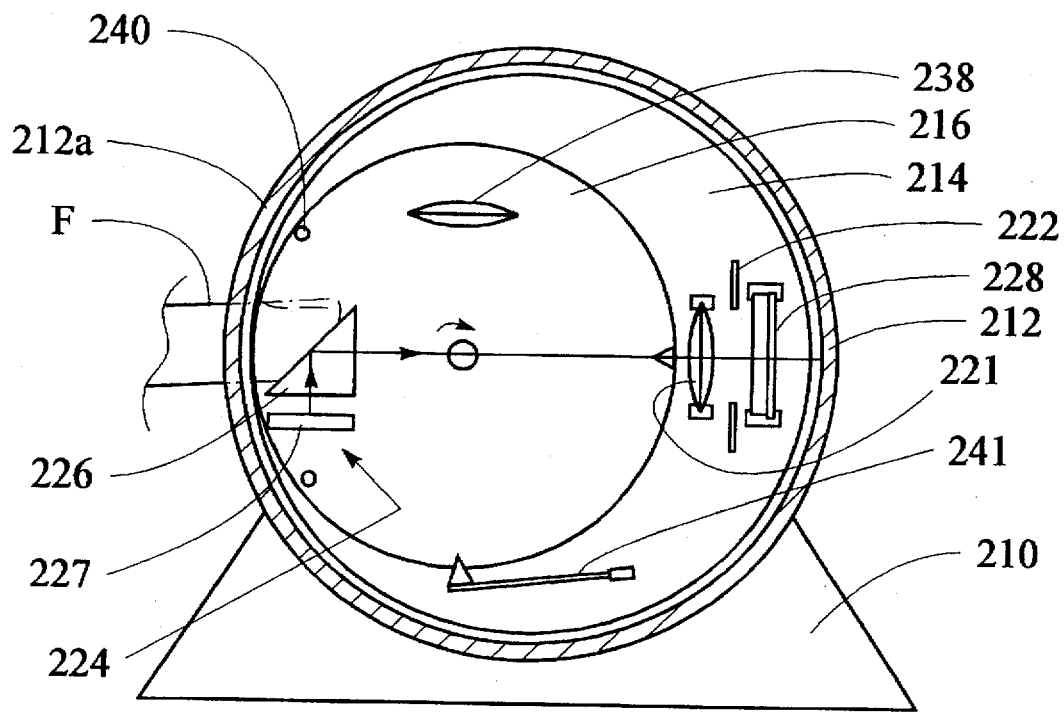
FIGS. 3a and 3b show first and second positions of a third embodiment.
Figure 3B:
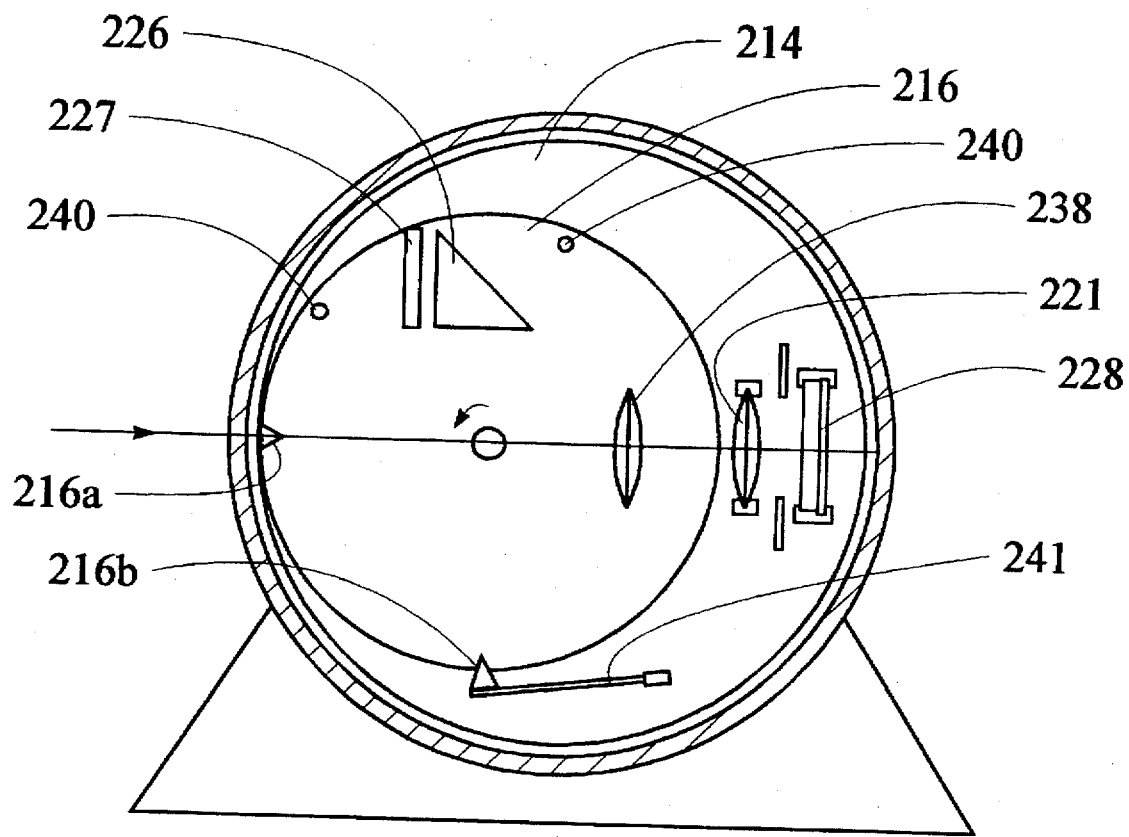

FIGS. 3a and 3b show a further alternative arrangement, in which the prism and auxiliary lens are made movable.

Here, base 210, housing 112, plate 214, fingerprint station 224 with prism 226 and light source 227, and CCD camera 228 are similar to parts 10, 12, 14, 24, 26, 27 and 28 of the first embodiment. The plate 216 in this embodiment, however, is rotatable about a shaft 217 eccentric to the center of the plate 214, and carries the prism 226 and the light source 227, and also carries the auxiliary lens 238 located on an axis which is perpendicular, relative to the axis of shaft 217, to the optical axis of the light leaving the prism 226. The plate 216 is held in a first position, shown in FIG. 3a, by a pawl 241 which engages in a notch 216a in the side of plate 216, but the plate is rotatable through 90E into the FIG. 3b position in which the pawl engages a second notch 216b. Rotation is achieved by a finger inserted into aperture 212a in the housing and manipulation of projections 240 on the plate 216.

In the first position, the prism 226 is aligned with the axis of shaft 217 and with the lens 221, iris 222, and camera 228. In the second position, shown in FIG. 3b, the prism 226 and light source 227 are rotated out of the optical path which includes the camera, and instead the auxiliary lens 238 is inserted into the optical path so that this lens, assisted by lens 221, can focus the camera on objects outside the apparatus.

Figure 4:
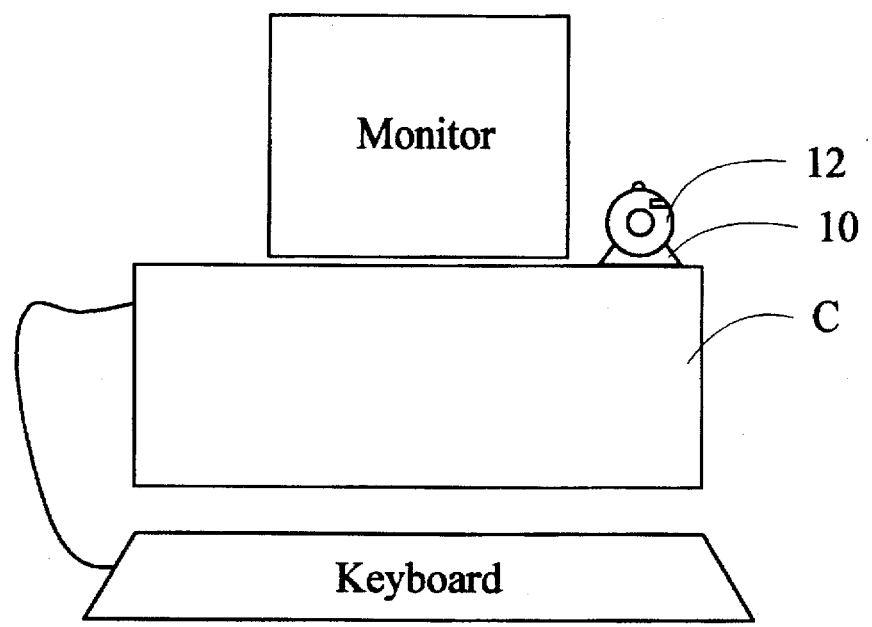
FIG. 4 shows the embodiment of FIG. 1a as mounted on a personal computer.

FIG. 4 shows how the device can be mounted on the casing of a personal computer C, which is connected to the CCD camera for fingerprint analysis. When not used in such analysis, the device can be used to image other objects, such as for example the person using the computer.

Figure 5:
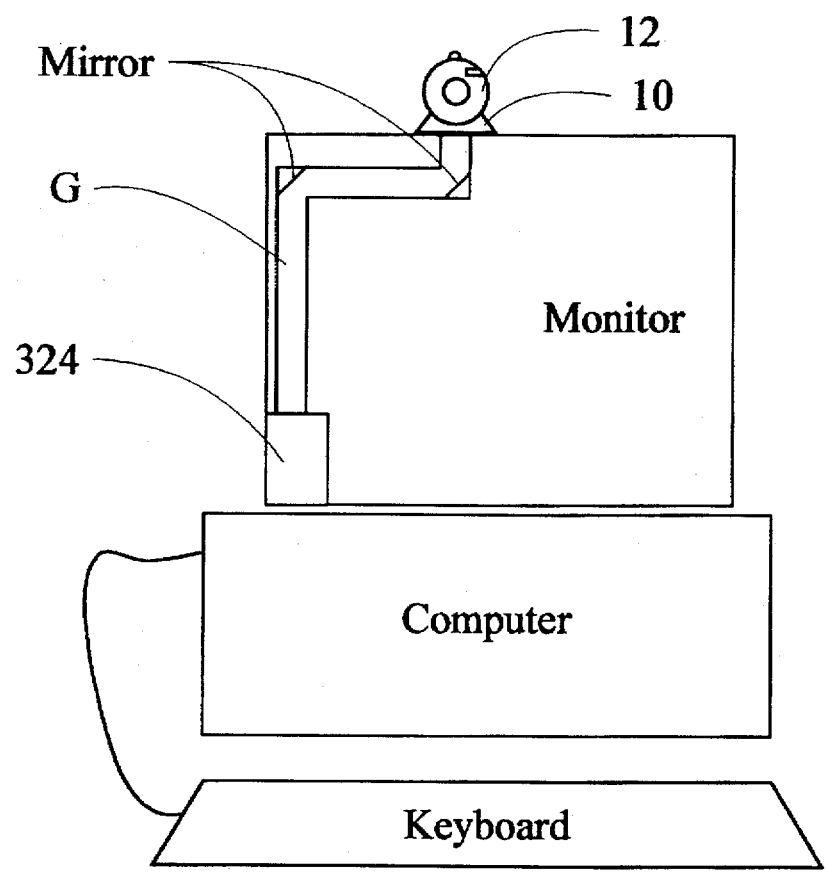
FIG. 5 shows the embodiment of FIG. 1 a mounted on a computer monitor.

FIG. 5 shows an alternative arrangement, in which the fingerprint testing station 324, including a suitable prism, is remote from the device. Here, an optical guide G fitted within the monitor transmits an image of the fingerprint from the prism to the device. The optical guide may be a kind of periscope device with several mirrors. In this case the device is modified, as compared to what is shown in FIGS. 1a–2b, by removal of the prism and light source, the optical guide being connected to an aperture in the housing such as aperture 12a.

Numerous other embodiments may be envisaged without departing from the spirit and scope of the invention.

What I claim is:

1. Apparatus for use in a fingerprint imaging system, of the type comprising:
   a) a light source;
   b) a fingerprint testing station for producing and transmitting an image of a fingerprint reflected off a fingertip;
   c) a first lens means for receiving light from the fingerprint testing station and for producing an image of said fingerprint;
   d) a CCD camera means for convernting said fingerprint image in a first optical path which includes the fingerprint testing station and the first lens, into an electrical signal;
   wherein said apparatus further includes:
   e) a second lens means for receiving miscellaneous images of objects viewable from the vicinity of the apparatus which are displaced from the fingerprint testing station; and
   f) means for selectively providing a further optical path including said second lens and said CCD camera while interrupting said first optical path;
   whereby said CCD camera is selectively operable for imaging said objects as well as for imaging fingerprints.

2. Apparatus for use in a fingerprint imaging system, of the type comprising:
   a) a light source;
   b) a fingerprint testing station for producing and transmitting an image of a fingerprint reflected off a fingertip;
   c) a first lens means for receiving light from the fingerprint testing station and for producing an image of said fingerprint;
   d) a CCD camera means for converting said fingerprint image in a first optical path which includes the fingerprint testing station and the first lens, into an electrical signal;
   wherein said apparatus further includes:
   e) a second lens means for receiving miscellaneous images of objects viewable from the vicinity of the apparatus which are displaced from the fingerprint testing station: and f) means for selectively providing a further optical path including said second lens and said CCD Camera while interrupting said first optical path, wherein said means for providing said further optical path includes a mirror movable to an operative position in which it interrupts light in said first optical path and reflects light coming from said second lens into the CCD camera;

whereby said CCD camera means is selectively operable for imaging said objects as well as for imaging fingerprints.

3. Apparatus according to claim 2, wherein said means for providing said further optical path includes a rotatable mounting for the first lens and for the mirror.

4. Apparatus for use in a fingerprint imaging system, of the type comprising:

a) a light source:

b) a fingerprint testing station for producing and transmitting an image of a fingerprint reflected off a fingertip:

c) a first lens means for receiving light from the fingerprint testing station and for producing an image of said fingerprint;

d) a CCD camera means for convernting said fingerprint image in a first optical path which includes the fingerprint testing station and the first lens, into an electrical signal;

wherein said apparatus further includes:

e) a second lens means for receiving miscellaneous images of objects viewable from the vicinity of the apparatus which are displaced from the fingerprint testing station; and f) means for selectively providing a further optical path including said second lens and said CCD camera while interrupting said first optical path, wherein said means for providing said further optical path includes a rotatable mounting for the CCD camera capable of bringing the CCD camera into an alignment position with the second lens;

whereby said CCD camera is selectively operable for imaging said objects as well as for imaging fingerprints.

5. Apparatus according to claim 4, wherein said rotatable mounting, also carries said first lens and wherein said further optical path includes both the first lens and the second lens.

6. Apparatus for use in a fingerprint imaging system, of the type comprising:

a) a light source;

b) a fingerprint testing station for producing and transmitting an image of a fingerprint reflected off a fingertip;

c) a first lens means for receiving light from the fingerprint testing station and for producing an image of said fingerprint;

d) a CCD camera means for convernting said fingerprint image in a first optical path which includes the fingerprint testing station and the first lens, into an electrical signal;

wherein said apparatus further includes:

e) a second lens means for receiving miscellaneous images of objects viewable from the vicinity of the apparatus which are displaced from the fingerprint testing station; and f) means for Selectively providing a further optical path including said second lens and said CCD camera while interrupting said first optical path, wherein said means for providing said further optical path includes a mirror movable to an operative position in which it interrupts light in said first optical path and reflects light coming from said second lens into the CCD camera;

whereby said CCD camera means is selectively operable for imaging said objects as well as for imaging fingerprints.

7. Apparatus for use in a fingerprint imaging system, of the type comprising:

a) a light source;

b) transparent means having an imaging surface on which a finger tip having a fingerprint to be imaged is placed and capable of transmitting light reflected off said finger tip;

c) a first lens means for receiving light from the transparent means and for producing an image of said fingerprint;

d) a CCD camera means for convernting said fingerprint image in a first optical path which includes the transparent means and the first lens, into an electrical signal;

wherein said apparatus further includes:

e) a rotatable mounting for the first lens, said mounting also carrying a mirror movable from a first position to a second position;

f) a second lens means for receiving miscellaneous images of objects viewable from the vicinity of the apparatus which are displaced from the transparent means; and g) means for moving the rotatable mounting and the mirror from a first position in which the first lens is in said first optical path and the mirror is out of said first optical path, to a second position in which the first lens means is out of the first optical path, and in which the mirror interrupts light coming from the transparent means towards the CCD camera means and directs light coming from the second lens towards the CCD camera.

8. Apparatus for me in a fingerprint imaging system, of the type comprising:

a) a light source;

b) transparent means having an imaging surface on which a finger tip having a fingerprint to be imaged is placed and capable of transmitting light reflected off said finger tip;

c) a first lens means for receiving light from the transparent means and for producing an image of said fingerprint;

d) a CCD camera means for convernting said fingerprint image in a first optical path which includes the transparent means and the first lens, into an electrical;

wherein said apparatus further includes:

e) a rotatable mounting for the first lens, said mounting also carrying a mirror movable from a first position to a second position;

f) a second for receiving miscellaneous images of objects viewable from the vicinity of the apparatus which are displaced from the transparent means; and g) means for moving the rotatable mounting and the mirror from a first position in which the first lens means is in said first optical path and the mirror is out of said first optical path, to a second position in which the first lens is out of the first optical path, and in which the mirror interrupts light coming from the transparent means towards the CCD camera means and directs light coming from the second lens means towards the CCD camera, wherein there is provided a mechanical interlock to prevent movement of the rotatable mounting from the first position when the mirror is in its first position and the CCD camera is aligned to receive light from the transparent means.

9. Apparatus for use in a fingerprint imaging system, of the type comprising:

a) a light source;

b) transparent means having an imaging surface on which a finger tip having a fingerprint to be imaged is placed and capable of transmitting light reflected off said finger tip;

c) a first lens means for receiving light from the transparent means and for producing an image of said fingerprint;

d) a CCD camera means for convernting said fingerprint image in a first optical path which includes the transparent means and the first lens, into an electrical signal;

wherein said apparatus further includes:

e) a second lens means for receiving miscellaneous images of objects viewable from the vicinity of the apparatus which are displaced from the transparent means; and f) a rotatable mounting carrying both the first lens and the CCD camera, said mounting being movable from a first position in which the second lens means and CCD camera means are in said first optical path to a second position in which the first lens means and CCD camera means are optically aligned with said second lens mess to receive said miscellaneous images.

10. Apparatus for use in a fingerprint imaging system, of the type comprising:

a) a light source;

b) transparent means having an imaging surface on which a finger tip having a fingerprint to be imaged is placed and capable of transmitting light reflected off said finger tip;

c) a first lens means for receiving light from the transparent means and for producing an image of said fingerprint;

d) a CCD camera means for convernting said fingerprint image in a first optical path which includes the transparent means and the first lens means, into an electrical signal;

d) a CCD camera means for convernting said fingerprint image in a first optical path which includes the first lens means, into an electrical signal;

wherein said apparatus further includes:

e) a second lens means for receiving miscellaneous images of objects viewable from the vicinity of the apparatus which are displaced from the transparent means; and f) a rotatable mounting carrying both the second lens means and the transparent means, said mounting being movable from a first position in which the transparent means is in said first optical path and the second lens is out of the first optical path, to a second position in which the transparent means is out of the first optical path and the second lens means is in the first optical path.

* * * * *